(12) United States Patent
Imai et al.

(10) Patent No.: US 6,862,279 B1
(45) Date of Patent: Mar. 1, 2005

(54) MULTICAST DISTRIBUTION SYSTEM OF PACKETS

(75) Inventors: Yuji Imai, Kanagawa (JP); Masanobu Yuhara, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 869 days.

(21) Appl. No.: 09/590,264

(22) Filed: Jun. 9, 2000

(30) Foreign Application Priority Data

Jun. 10, 1999 (JP) .......................................... 11-163463

(51) Int. Cl.[7] .............................................. H04L 12/28
(52) U.S. Cl. ...................................... 370/390; 370/389
(58) Field of Search ................................. 370/389, 390, 370/395.3, 413, 474

(56) References Cited

U.S. PATENT DOCUMENTS

| | | | | |
|---|---|---|---|---|
| 5,309,433 A | * | 5/1994 | Cidon et al. | 370/390 |
| 5,602,841 A | * | 2/1997 | Lebizay et al. | 370/413 |
| 5,774,465 A | * | 6/1998 | Lau et al. | 370/395.3 |
| 6,636,510 B1 | * | 10/2003 | Lee et al. | 370/390 |

FOREIGN PATENT DOCUMENTS

EP 579567 A2 * 1/1994 ........... H04L/12/56

OTHER PUBLICATIONS

"Multicast Source Routing in Packet Switched Networks", Yum et al, 1991, pp. 1284–1288, IEEE CH2979-3/91/0000-1284.*

"Multicast Source Routing in Packet Switched Networks", Yum et al, 1994, pp. 1212–1215 IEEE Trans .on Com. Sci., vol. 42, No. 2/3/4.*

* cited by examiner

*Primary Examiner*—Salvatore Cangialosi
(74) *Attorney, Agent, or Firm*—Staas & Halsey LLP

(57) ABSTRACT

A multicast distribution system of packet comprises routers connected with each other by a cable. Nodes are connected to each of the routers. The routers or the nodes is provided with a unit for relaying a packet having a list of the plurality of destination addresses and its undistributed bit map to the packet header to be transferred, according to the unicast route.

22 Claims, 15 Drawing Sheets

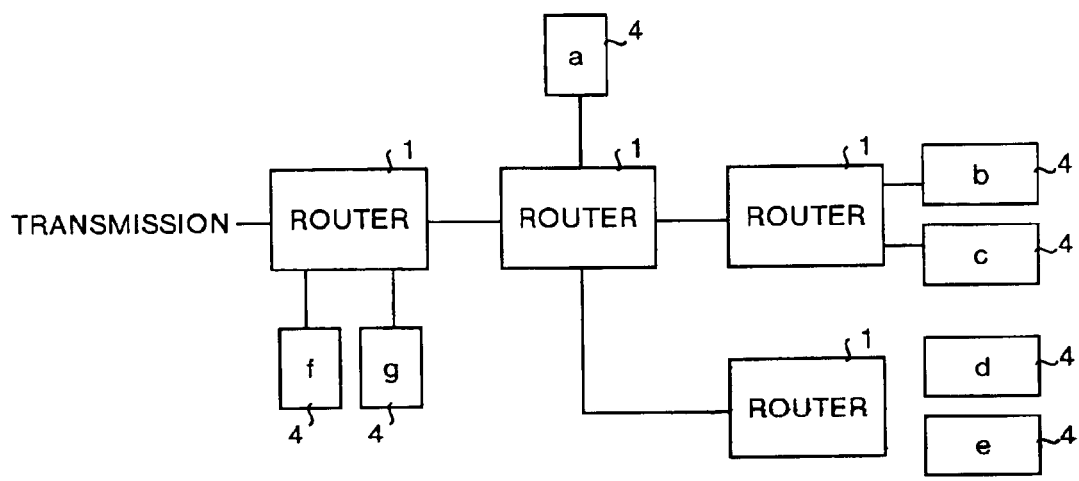

| net work | gateway | interface |
|---|---|---|
| loopback | — | loopback |
| W | — | ethernet |
| default | w | ethernet |

FIG.8

| [R1] net work | gateway | interface |
|---|---|---|
| loopback | — | loopback |
| W | — | ethernet (W) |
| X | r2 | r1 |
| Y | — | ethernet (Y) |
| Z | r2 | r1 |
| [R2] net work | gateway | interface |
| loopback | — | loopback |
| W | r1 | r2 |
| X | — | ethernet (X) |
| Y | r1 | r2 |
| Z | — | ethernet (Z) |

FIG.11

| Type=MSCinquiry | Code=None | checksum | ICMP Hdr |
|---|---|---|---|
| # of bitmap=1 | Identifier = ID of MSC | | |
| 0 0 0 1 1 0 0 | | | |

↑ ↑
EQUIVALENT TO e, f

FIG.15
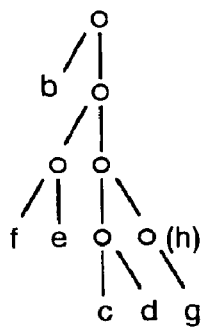
FIG.16
| TWO DESTINATIONS/ ONE DESTINATION | NONE | ONE GROUP | TWO GROUPS OR MORE |
|---|---|---|---|
| NONE | (A) | (B) | (C) |
| ONE GROUP OR MORE | (C) | (C) | (C) |
FIG.17
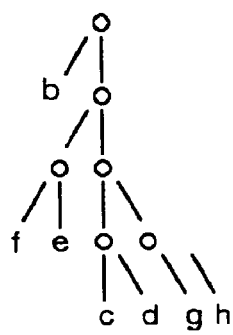

FIG.20

| Version | Class | Flow Label | | |
|---|---|---|---|---|
| Payload Length | | | NextHeader | Hop Limit |
| Source Address | | | | |
| Destination Address | | | | |
| HOST PROTOCOL DATA | | | | |

FIG.21

| Network | | Destination | |
|---|---|---|---|
| network prefix | net mask | neighbor | interface |
| 3FFE:501:1000:: | 40 | 12345678 | le0 |
| 3FFE:501:1100:: | 40 | 12345678 | ppp0 |
| ⋮ | ⋮ | ⋮ | ⋮ |
| 3FFE:501:1FFF:: | 44 | 12345678 | le0 |
| FF02::1 | 128 | 12345678<br>87654321 | le0<br>ppp1 |
| FF02::2 | 128 | 12341111<br>12342222<br>12343333 | le0<br>ppp1<br>ppp2 |
| FF02::3 | 128 | 12341111 | le0 |

UNICAST SECTION (rows 3FFE:501:1000:: through 3FFE:501:1FFF::)

MULTICAST SECTION (rows FF02::1 through FF02::3)

MULTICAST DISTRIBUTION SYSTEM OF PACKETS

FIELD OF THE INVENTION

The present invention relates to a multicast distribution system in a distributed packet exchange network.

BACKGROUND OF THE INVENTION

In a distributed packet exchange network such as the Internet, the packet distribution format is classified into several types according to the destination designation method. Following packet distributions are employed in IPv4 used in the present Internet and IPv6 which is standard of next-generation Internet.

1) Unicast distribution in which the destination is the address expressing the single interface,
2) Multicast distribution (hereafter referred to as multicast) in which the destination represents a group of a plurality of interfaces, and copy of packet (in the explanation below 'packet' may mean 'packets') is distributed to all of them, and
3) Anycast distribution in which the destination represents a group of the plurality of interfaces, and copy of packet is distributed to any one of them.

The present invention relates to the above-mentioned multicast. In multicast it is possible to distribute same data efficiently to a plurality of nodes. Therefore, this type of distribution is utilized in the fields of multimedia data broadcast, multi-point audio and video conference, etc.

An example of realizing multicast in IPv4 will be explained here as a prior art. In IPv6 of which standardization is being presently proposed, the method of realization is nearly the same as explained here. Actual execution of multicast requires three steps described in detail below. That is:

1) Address assignment of multicast,
2) Request of route setting, and
3) Packet distribution.

1) Address Assignment of Multicast:—

In IPv4, of the IP (Internet protocol) address space of four octets, one-sixteenth is assigned for the space of multicast called class D. The address of class D is determined so that the higher four bits may start with 1110. A sender of multicast of packet is assigned with a multicast address by the IANA (Internet Assigned Number Authority) and ICANN (Internet Corporation for Assigned Names and Numbers), one each for every group of address node for multicast.

2) Request of Route Setting

The sender, while communicating with each one of the receivers, must request preliminarily route setting to be used in the actual packet distribution (described below) to all routers on the route to which the multicast packet is distributed.

3) Packet Distribution

IPv6 packet has the header format as shown in FIG. 20 in both unicast and multicast. 'Version' in this figure refers to the edition number, 'Class' indicates whether the data is video, audio or normal data, and 'Flow Label' determines the flow number to be given to the flow.

'Payload Length' denotes the data length, and the 'Next-Header' tells which protocol in advance. 'Hop Limit' indicates the upper limit of the number of repeats to avoid endless hopping of packet in the network.

'Source Address' is the sender's address and 'Destination Address' is the end address. Finally, the host protocol data is provided.

The transmission node stores and transmits the multicast address assigned to the destination address among them. An intermediate router searches the route table prepared for relaying the packet in a correct direction. The route table is composed as shown in FIG. 21. 'Network' row in this figure lists up the networks that can be reached from this route on the Internet.

The network is expressed by the network prefix and mask (net mask). For example, if the prefix is 3FFE:501:1000::, and the mask is 40 (FFFF:FFFF:FF00::), it expresses a network in a range of 3FFE:501:1000:0:0:0:0: to 3FFE:501:10FF:FFFF:FFFF:FFFF:FFFF:FFFF.

'Destination' row in FIG. 21 expresses the address neighbor of the route to which the router itself request distribution next for distributing the packet to this network, and the interface for sending out the packet for this purpose. The route table search is to calculate the AND of the address to be searched and net mask in the first place, and find out an item of which result is equal to the network prefix, and the packet is distributed from the interface to the destination neighbor of the searched item (various high speed techniques are proposed for this route table search, and many patents are pending).

When relaying the unicast address, only one destination is always set, and the packet is transferred from the designated interface to the next designated router. Since one next router is always set in all routers from the sender to the receivers, as a result, the packets are distributed on one route.

On the other hand, in the multicast, only one destination is present, or two or more, depending on the router. In the case of one destination, the operation is same as in unicast, but in the case of two or more, the packet is copied and distributed to each one. Accordingly, only one packet at the time of transmission is branched off on the network, and is distributed to a plurality of receivers.

The existing multicast system involves the following problems.

1) Address Assignment

In the case of multicast, one multicast address must be assigned to every group to be distributed to. In the case of the broadcasting type multicast as substitute for the existing television and radio, a permanent address can be assigned, but in the case of communication with dynamically increasing channels such as multi-point television conference relay, it is required to issue multicast address dynamically on every occasion. It requires a uniform rule by the Internet, and in order to match commonly, a certain complicated structure is needed.

2) Router Setting

After multicast address assignment, items of multicast addresses must be set in the route table of all routers existing in the route from the sender to the individual destination clients. In the key router of the Internet, this route table is an enormous number. Further, in the destination node group corresponding to the multicast address, members are changed frequently. On every occasion, the route must be calculated again, and the route table must be updated. This processing is also an enormous amount.

SUMMARY OF THE INVENTION

It is an object of this invention to provide a multicast distribution system in which setting of addresses and setting of the route, in a router are not necessary.

(1) FIG. 1 is a block diagram showing the principle of the invention. In the illustrated system, routers 1 are connected with each other through an exclusive line 2. Nodes 4 are connected to each router 1. Legend 3 represents a packet transferred on the exclusive line.

In FIG. 1, a packet having a plurality of address lists and undistributed bit map is relayed to the packet header to be transferred according to the unicast route. A relay unit is provided in the router 1 or the node 4 for this purpose. The node 4 functions as transmitter or client as explained below.

According to the above configuration, without having multicast route information, multicast distribution is realized by the unicast route information only.

(2) Further, when distributing a same packet to the plurality of destinations, a list of destination addresses and undistributed bit map are stored in the packet header and transmitted, in which the node transmits by itself, and inspects the packet arriving at the own interface, and when the own node is included in the destination list, it is accepted.

According to the above configuration, without having multicast route information, multicast distribution is realized by the unicast route information only.

(3) Further, the present invention comprises a transmitter for transmitting by storing a list of destination addresses and undistributed bit map in a packet header when distributing a same packet to the plurality of destinations, in which when the router relays the packet transmitted by the transmitter together with the branching regularity mark, the route table is searched for two nodes at both ends of the row not distributed according to the undistributed bit map, and if branching is not necessary, route search is omitted relating to other address, and the route table of all destinations is searched only when branching is necessary.

According to the above configuration, in the case of multicast packet distribution, the number of unicast addresses to be searched is smaller, and the packet distribution processing is smaller.

(4) Further, as for the address already distributed at the time of packet branching, the value is changed to a meaningless value as address, and then distributed.

As a result, one's own participation is kept secret to other clients participating in the multicast.

Or, when distributing the same packet to the plurality of destinations, by comprising a transmitter for transmitting by storing a list of destination addresses and undistributed bit map in a packet header, transmission of multicast packet is realized without requesting setting of multicast route information to the repeating router group.

Besides, by using a transmitter for transmitting together with a mark proving finish of distribution, by arranging the address appearance order in the list preliminarily so that the undistributed portions of the undistributed bit map may be always continuous at an arbitrary path on the packet distribution route, the branching regularity router (mentioned later) can be efficiently distributed in multicast packet.

When relaying the packet transmitted by the transmitter together with the branching regularity mark by comprising a router for searching the route table only for two nodes at both ends of the row not distributed in the undistributed bit map, omitting the route search about other address if branching is not necessary, and searching the route table of all destinations only when branching is necessary, at the time of multicast packet distribution, the number of unicast addresses to be searched is smaller than in the router mentioned in connection to one aspect of this invention, and the packet distribution processing is smaller.

Also by including a transmitter for transmitting a branch search packet having an address list, and creating a branching regularity list according to the obtained search result, the branching regularity list can be created automatically. As a result, the manager does not have to prepare a regular list beforehand.

As for the route search packet transmitted by the transmitter, by comprising a router for searching the route table, relaying the search packet by adding an undistributed bit map to the end of the undistributed route list to the own router when branching, and relaying the search packet directly if not branching, the branching regularity list can be crated automatically. As a result, the manager does not have to prepare a regular list beforehand.

By comprising a client for returning the undistributed route list of search packet directly to the transmitter at the destination node of relaying the search packet, the branching regularity list can be crated automatically. As a result, the manager does not have to prepare a regular list beforehand.

As a result of route table search, if there is a route having one or two destinations for relaying to the same router, by comprising a router for omitting relaying of route search packet until two routes become one or one route becomes two, the number of packets for route search is smaller, and the judging process at the transmitter is smaller. As a result, the network flow rate is saved. Further, the repeating processing and aliasing processing at the router and client can be saved.

On the condition that the route search packet is omitted by the router, by having a router for analyzing the branching tree and arranging the address list according to the branching regularity, the number of packets for route search is smaller, and the judging process at the transmitter is smaller. As a result, the network flow rate is saved. Further, the repeating processing and aliasing processing at the router and client can be saved.

By having a transmitter capable of adding or deleting the destination address in the midst of a series of packet transmission, it is possible to join or leave the channel in the midst of multicast distribution.

By having a transmitter for searching the route about the added address and keeping the address in branching regularity, the efficiency of distribution by branching regularity maintains if joining or leaving the channel in the midst of multicast distribution.

By having a transmitter for transmitting a regularity inspection packet for checking whether the address list is branching regularity or not periodically, and redoing regularity when receiving an irregularity notice, if the route is changed while repeating the multicast, it is detected in a certain time and handled adequately.

Also by having a router for searching the route table of address list of regularity inspection packet transmitted by the transmitter, returning the irregularity notice when the regularity is broken, and repeating the inspection packet otherwise, if the route is changed while repeating the multicast, it is detected in a certain time and handled adequately.

In the configuration comprising the transmitter and router, if it is designed to store one of the nodes of the undistributed address list as former destination address of the packet, if there is a router not depending on the distribution of the invention in the midst of the multicast distribution route, multicast repeating is possible.

By having a node which transmits by itself, inspects the packet arriving at the own interface, and accepts it when the own node is included in the destination list, without having multicast route information, multicast distribution is realized by the unicast route information only.

The invention solves the above problems by improving the conventional packet in which only one destination could be designated, and by adding a list of the plurality of destination addresses and a bit map showing undistributed addresses in the list has an extension header of packet.

Other objects and features of this invention will become apparent from the following description with reference to the accompanying drawings.

BRIEF DESCRIPTION OF THE DRAWINGS

FIG. 3 is a block diagram showing an embodiment of the invention.

FIG. 4 is a diagram showing transition of bit map.

FIG. 5 is an explanatory diagram of group branching.

FIG. 8 is a diagram showing routes of R1, R2.

FIG. 11 is a diagram showing an example of composition of ICMP.

FIG. 15 is a diagram showing route tree in the midst of analysis.

FIG. 16 is a diagram showing group case dividing in each repeating destination interface.

FIG. 17 is an explanatory diagram of omission of relaying to h, c, e, b.

FIG. 20 is a structural diagram of header format of IPv6.

FIG. 21 is a diagram showing composition of search table.

DESCRIPTION OF THE PREFERRED EMBODIMENTS

Figure 1:
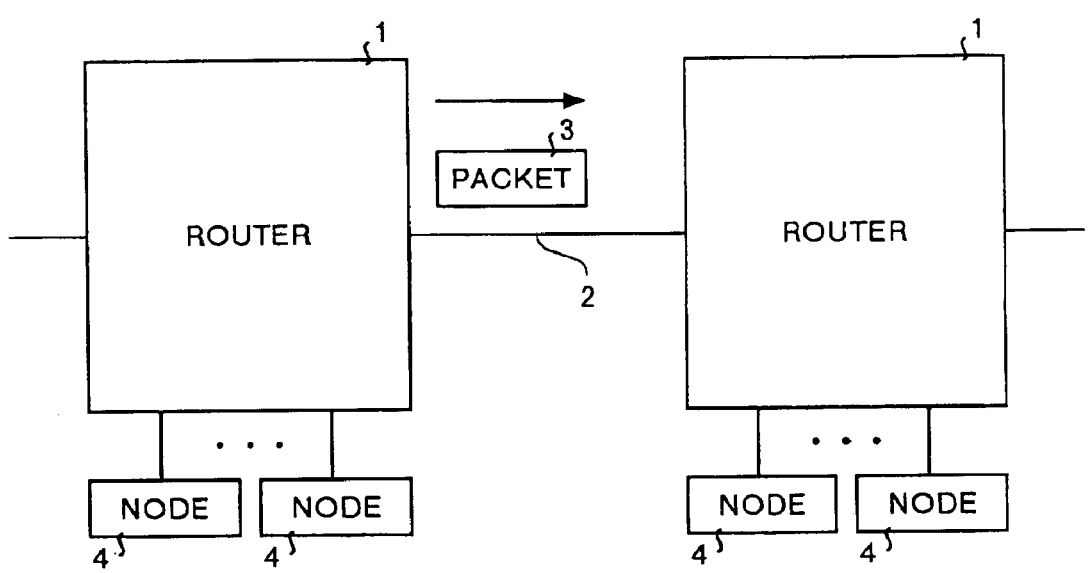
FIG. 1 is a block diagram showing the principle of the invention.

Referring now to the drawings, preferred embodiments of the invention are described in detail below.

Figure 2:
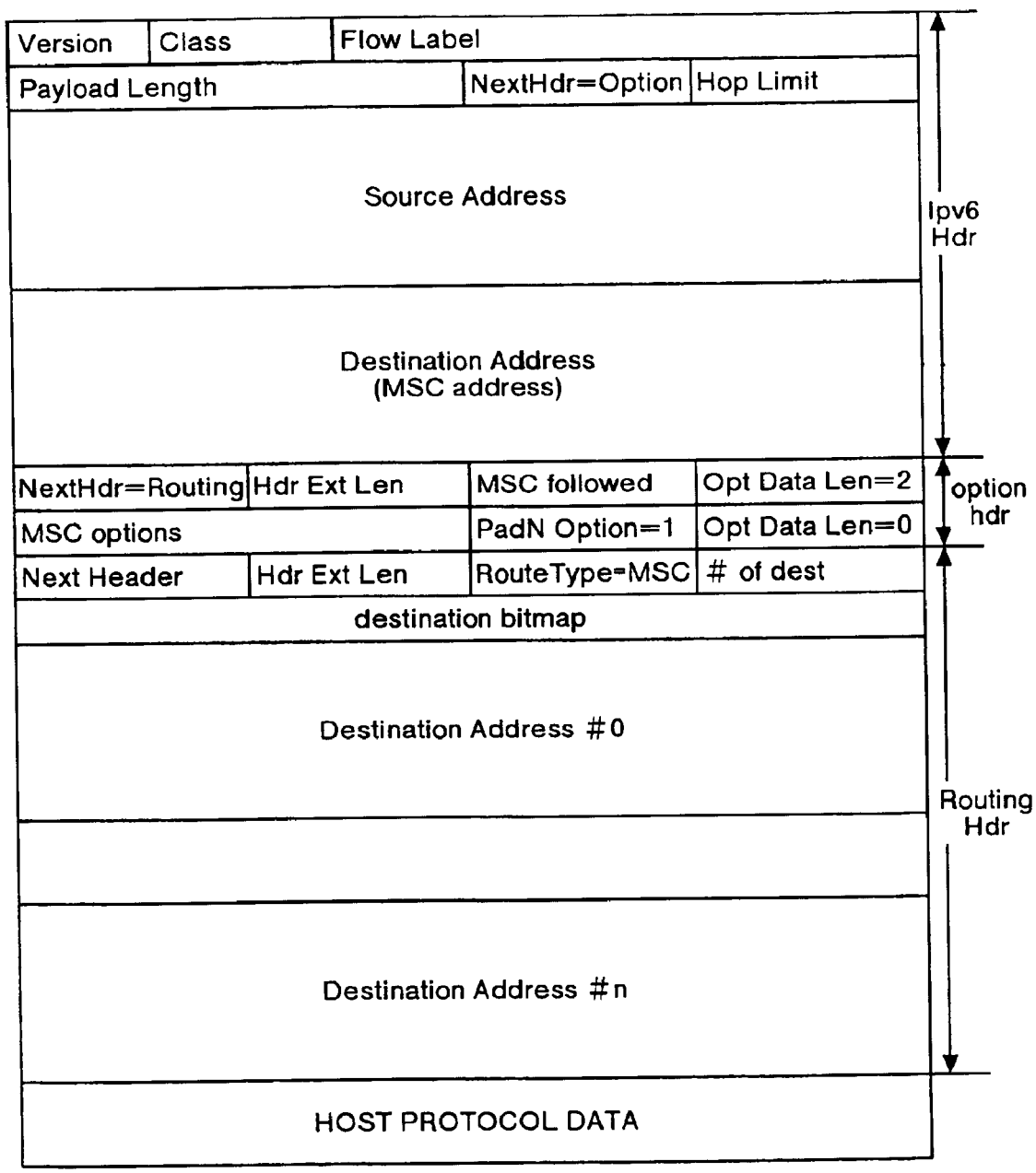
FIG. 2 is a diagram showing an example of composition of packet.

A server for transmitting data by multicast prepares a packet in a format shown in FIG. 2. The meaning of items different from those in the IP header are as follows.

(a) Destination Address (MSC address)

This is a special IP address showing this packet is an MSC (Multicast for Small Community). An intermediate router discriminates that this packet should be processed by the multicast system of the invention.

(b) MSC Options

An option is designated in this item when assuring the subsequent processing variation.

(c) # of dest

The length of list of addresses included in this packet.

(d) Destination Address #n

An n-th destination address to which the multicast address is distributed.

(e) Destination Bitmap

A bit map in which n-th destination to be reached henceforth by the packet in the address list is "1", and the destination not necessary to reach from this packet is "0". Initially, all is "1".

When the number of destination addresses exceeds 32, following the 32nd address, a list of addresses is added successively across a bit map of 33rd to 65th addresses.

The router of the embodiment searches the route table for unicast as for the bit map being "1" of the addresses in the list. As a result of search, the packet is transferred to each one of the subsequent routers. At this time, if the next router is the same as a result of search, only one packet is enough, and multicast is realized. The bit map showing the position of the destination address to which the repeating packet is further relayed is "1", and others are "0".

In this configuration, without having multicast route information, multicast distribution is possible by the unicast route information alone.

By this replaying, the packet reaches the final object node, and the list is inspected at this node, and if an address to the own is found, it is accepted, and a higher protocol stack (for example TCP) is processed. This embodiment includes a node which transmits by itself, inspects the packet arriving at the own interface, and accepts it when the own node is included in the destination list, and therefore, without having multicast route information, multicast distribution is realized by the unicast route information only.

Hereinafter, the branching regularity is a property of address list which is pretreated in order to simplify the route table search in the router. A branching regular address list refers to a sequential arrangement, in all routers in the multicast route, guaranteeing that the nodes of bit map being "1" are always continuous. For example, in the multicast for branching as shown in FIG. 3 (a block diagram showing an embodiment), suppose an address list of [a, b, c, d, e, f, g]. Same legends are provided to parts that are similar or same to those shown in FIG. 1.

The branching depth is assumed to be 2 in a, f, g, and 3 in b, c, d, and e. In the route from the sender to d, the router branch is passed three times. In this period, the bit map changes as shown in FIG. 4, and at any point of the route, the bit map 1 is continuous. This is established at all points, and hence [a, b, c, d, e, f, g] is a branching regularity.

On the other hand, a list [a, g, f, b, c, d, e] is a first branch going toward "a", and the bit map is [1, 0, 0, 1, 1, 1, 1], and hence "1" is isolated. Therefore, this is not branching regularity.

When the branching regularity is guaranteed, only the addresses at both ends of the bit map "1" portion are searched in the route table, and if known to be relayed to the same router, it is guaranteed to be distributed through the same router to the destinations on the way, and therefore the next relaying destinations can be determined without searching the route table.

The embodiment comprises a transmitter for transmitting by storing a list of destination addresses and undistributed bit map in a packet header when distributing a same packet to the plurality of destinations, and therefore transmission of multicast packet is possible without requesting setting of multicast route information to the repeating router group.

The transmitter capable of transmitting the packet in such format, and the router for efficiently searching the route table accordingly are described. In order to realize multicast by employing this method, the transmitter sets the bit showing that the address list is a branching regularity, in the MSC option, and the router inspects the establishment of this bit, and changes over the route table searching method.

The embodiment comprises a transmitter for transmitting together with a mark proving finish of distribution, by arranging the address appearance order in the list preliminarily so that the undistributed portions of the undistributed bit map may be always continuous at an arbitrary path on the packet distribution route, and therefore the branching regularity router can be efficiently distributed in multicast packet.

When relaying the packet transmitted by the transmitter together with the branching regularity mark, by comprising a router for searching the route table only for two nodes at both ends of the row not distributed in the undistributed bit map, omitting the route search about other address if branching is not necessary, and searching the route table of all destinations only when branching is necessary, at the time of multicast packet distribution, the number of unicast addresses to be searched is smaller than in the router mentioned in connection to one aspect of the present invention, and the packet a distribution processing is smaller.

The mechanism for arranging the list in the branching regularity is explained below. The transmitter attaches a list of addresses desired to have the branching regularity to a packet in which the higher protocol data is empty, and transmits to the MSC option together with a request mark for route search. The router operates as mentioned in connection to one aspect of the present invention and performs multicast, and if branching the packet at the same time, additionally records how the packet is branched, as bit map, to the end of the higher protocol data portion.

When the packet reaches the destination client, the history showing how the packet is branched is recorded from the transmitter. It is directly returned to the transmitter. When the branching history is returned to the transmitter from all clients, the branching tree is analyzed, and arranged in the branching regularity.

According to this embodiment, the invention comprises a transmitter for transmitting a branch search packet having an address list, and creating a branching regularity list according to the obtained search result, the branching regularity list can be created automatically. As a result, the manager does not have to prepare a regular list beforehand.

As for the route search packet transmitted by the transmitter, by comprising a router for searching the route table, relaying the search packet by adding an undistributed bit map to the end of the undistributed route list to the own router when branching, and relaying the search packet directly if not branching, the branching regularity list can be created automatically. As a result, the manager does not have to prepare a regular list beforehand.

By comprising a client for returning the undistributed route list of search packet directly to the transmitter at the destination node of relaying the search packet, the branching regularity list can be crated automatically. As a result, the manager does not have to prepare a regular list beforehand.

In the branching regularity search, as for the partial branching tree of which regularity is evident, a branching regular list can be created without such inspection, and the search process is efficient.

The reason why search is not required depends on the mathematical induction about the number of addresses as explained below.

First, in the case of one or two addresses, evidently, it is branching regularity.

Suppose a branching regular list can be prepared as for the list of n−1 or less. Assume there are three or more (for example, n) addresses. A certain router receives a search packet of which n destinations are not distributed yet. By branching it, it can be divided into two groups at least, or n groups at the most. Each undistributed destination is one at least, or n−1 at the most. Herein, classifying by the number of groups containing one destination and two, it is as shown in FIG. 5.

In (A), there is no group having one or two destinations, the packet is branched only into groups with three or more. Being branched, anyway, each group has n−1 or less. In this case, adding and updating the history, by relaying the search packet to all groups, the partial list of branching destination can be set in branching regularity by the packet returning from the relaying destination. All groups are linked in this way.

In (B), the group as one destination, and there is no group having two destinations. The group with one destination is evidently regular in branching, and is not relayed. Other groups are relayed. As a result, the history is returned to other groups. Although the history is not returned to the one group being omitted, but by collecting the histories of other groups, it is known that there has been one branch, and it can be linked to the branching regularity of other groups.

In (C), similarly, there is either one group having one omitted destination or two groups having one omitted destination, and anyway by linking two missing destinations, it is the branching regularity, which is connected to the branching regularity list of other groups.

According to this embodiment, as a result of route table search, if there is a route having one or two destinations for relaying to the same router, by comprising a router for omitting relaying of route search packet until two routes become one or one route becomes two, the number of packets for route search is smaller, and the judging process at the transmitter is smaller. As a result, the network flow rate is saved. Further, the repeating processing and aliasing processing at the router and client can be saved.

On the condition that the route search packet is omitted by the router, by having a router for analyzing the branching tree and arranging the address list according to the branching regularity, the number of packets for route search is smaller, and the judging process at the transmitter is smaller. As a result, the network flow rate is saved. Further, the repeating processing and aliasing processing at the router and client can be saved.

Besides, a transmitter capable of adding or deleting the address by changing the destination is realized. By using such transmitter capable of adding or deleting the destination address in the midst of a series of packet transmission, it is possible to join or leave the channel in the midst of multicast distribution.

This is a transmitter for starting again, from the beginning, normalization of branching at the time of the transmitter operation when making efficient by using the branching regularity. According to this embodiment, by using the transmitter for searching the route about the added address and keeping the address in branching regularity, the efficiency of distribution by branching regularity maintains if joining or leaving the channel in the midst of multicast distribution.

When the router branches the packet, the content is cleared in the address of which bit map is "0", thereby concealing the intermediate route or end point or the destination of multicast by the host. According to the present invention, therefore, one's own participation can be kept secret to other clients participating in the multicast.

Moreover, inspecting the efficacy of regularity list once built up, it is possible to cope with adaptively if the routing environment is changed. When the transmitter sets the need of inspection in the option, each route of the route check the regularity. If not broken, it is returned to the source of transmission together with the history. Receiving it, the transmitter newly normalizes the necessary partial list.

According to this embodiment, the invention has a transmitter for transmitting periodically a regularity inspection packet for checking whether the address list is branching regularity or not, and redoing regularity when receiving an irregularity notice, if the route is changed while repeating the multicast, it is detected in a certain time and handled adequately.

Also by having a router for searching the route table of address list of regularity inspection packet transmitted by the transmitter, returning the irregularity notice when the regularity is broken, and repeating the inspection packet otherwise, if the route is changed while repeating the multicast, it is detected in a certain time and handled adequately.

Or, if there is a router not corresponding to the MSC in the midst of relaying, one undistributed address may be inserted, out of the MSC list, without inserting the address expressing the MSC, in the destination of IPv6 header so that the MSC may pass. The router can branch the non-MSC router whether to be relayed same as the ordinary unicast, or to interpret the MSC on the way or at the end.

According to this embodiment, the invention comprises the transmitter and router, if it is designed to store one of the nodes of the undistributed address list as former destination address of the packet, if there is a router not depending on the distribution of the invention in the midst of the multicast distribution route, multicast repeating is possible.

Figures 6, 7:
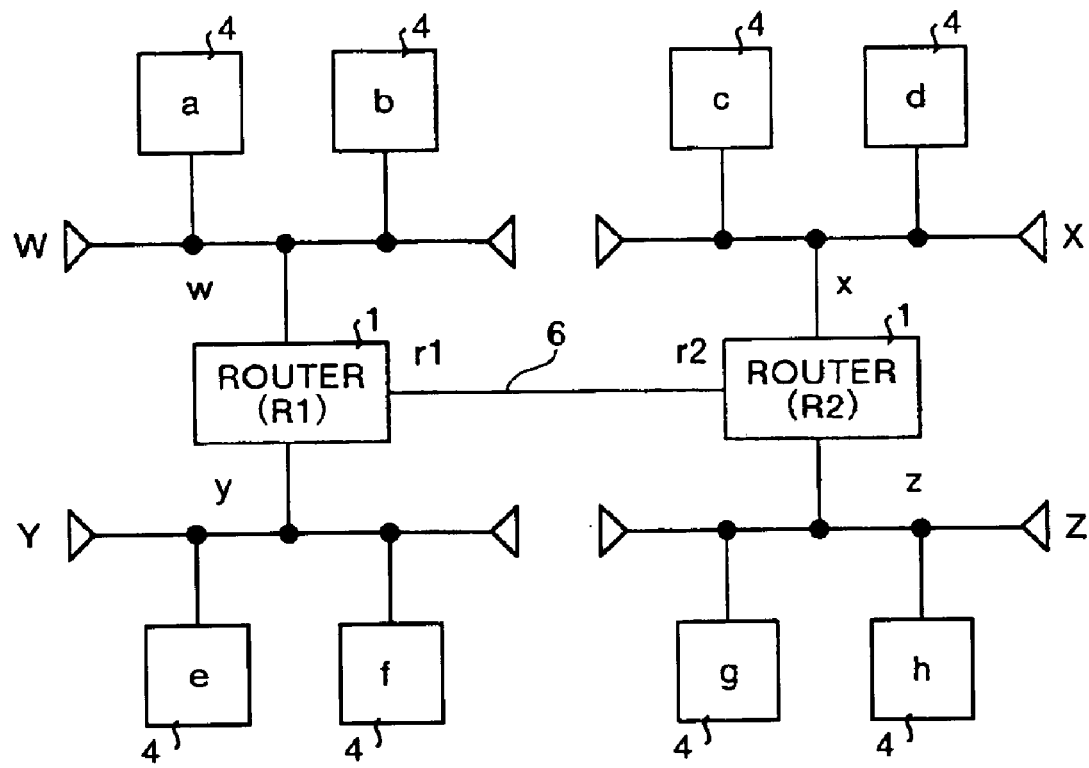
FIG. 6 is a block diagram showing other embodiment of the invention.
FIG. 7 is a diagram showing routes of a, b.

FIG. 6 is a block diagram showing other embodiment of the invention. In this embodiment, routers 1 are mutually connected through an exclusive line 6, and nodes 'a' to 'h' are connected to each router. This embodiment is explained below by using this network. The network comprises eight hosts (a to h), four Ethernets (W to Z), one exclusive line 6, and two routers R1, R2.

The host IP addresses are 'a' to 'h', and the IP address of each interface of the router is r1, r2 in the exclusive line and w, x, y, z at the Ethernet side. At this time, the host IP addresses a and b have the route table as shown in FIG. 7.

Similarly, 'c' and 'd' are route tables having W, w changed to X, x; e and f, changed to Y, y; and g and h, changed to Z, z.

The route table of the routers R1, R2 is as shown in FIG. 8.

An explanation will be provided for the operation.

First, an example will be explained. The sender of multicast packet is supposed to be a, and the receivers are b, c, d, e, f, g, h. The process on a requests message transmission through the socket interface.

sendto (socket, msg, length, flag, dest, destlen)

Herein, dest is a destination address designating structure (struct sock addr msc) newly defined for this purpose, and the destination list is stored as follows.

```
struct sock addr msc {
    short           smsc family;    /*AF MSC*/
    unsign int      smsc list desc; /*regular list desc*/
    char            smsc nnodes;    /*# of sest nodes*/
    struct inet addr v6 smsc addrs [MAX ADDR LIST] /*dest address list*
/
}
```

Herein, smsc family is a constant of an address family defined for msc.

smsc list desc is a list instructor used in the following branching regulation.

smsc nnodes is the number of destination nodes included in this list.

smcs addrs is the sequence of IPv6 address.

Node a transmits a packet having the following attributes to it.

Ipv6 src =a
Ipv6 dst =MSC
Ipv6 opt =MSC followed
MSC option =None
RoutType =MSC
# of dest =7
bitmap =[1,1,1,1,1,1,1]
dest addr =[b,c,d,e,f,g,h]

Figure 9:
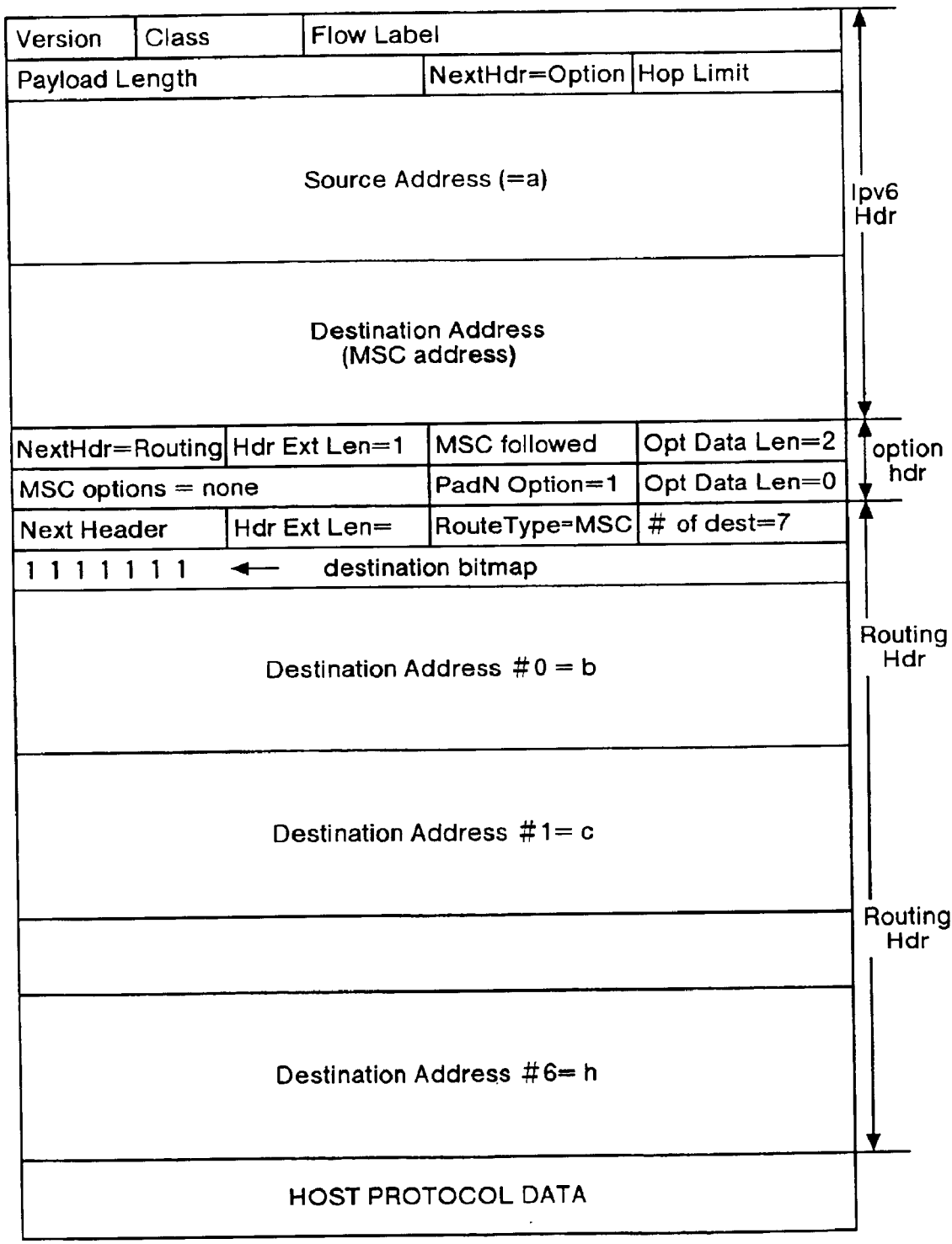
FIG. 9 is a diagram showing an example of composition of packet.

The packet is specifically as shown in FIG. 9.

The sender a, using the own route table, searches [b, c, d, e, f, g, h], and obtains the following result.

b: Direct distribution through Ethernet w possessed by own self.

c, d, e, f, g, h: Relaying through w.

When sending a packet directly to b, the bitmap is changed as follows.
bitmap =[1,0,0,0,0,0,0]
dest addr =[b,c,d,e,f,g,h]

To w, the following packet is sent.
bitmap =[0,1,1,1,1,1,1]
dest addr =[b,c,d,e,f,g,h]

Reviewing this packet, receiver b first inspect that IPv6 header shows the MSC, and then observing opt head, "no option" is confirmed, and the bit map of the routing header is inspected. The address with "1" is the own address, and it is accepted, and transferred to the host protocol.

Checking this packet, the router R1 first inspects that IPv6 header expresses the MSC, and checks the opt header to make sure no option. Next, the bit map of routing header is inspected. Each address with "1" is checked if it is own address or not, and the route table is inspected, and the following results are obtained.

c, d, g, h: Distributed through r2.
e, f: Distributed directly via Ethernet Y.

As a result, following bitmap is transmitted to r2 for c, d, g, h:
bitmap =[0,1,1,0,0,1,1]
dest addr =[b,c,d,e,f,g,h]

Following bitmap is transmitted to e:
bitmap =[0,0,0,1,0,0,0]
dest addr =[b,c,d,e,f,g,h]

Following bitmap is transmitted to f:
bitmap =[0,0,0,0,1,0,0]
dest addr =[b,c,d,e,f,g,h]

Example of Relaying Operation in Branching Regularity:

Next, as operation relating to branching regularity, an example will be explained below. Suppose transmission from node a to destinations [c, d, g, h]. In the case of the invention according to one aspect, the router R1 relays the following packet.
bitmap =[1,1,1,1]
dest addr =[c,d,g,h]

Accordingly, although four destinations are bound for the same relaying destination r2, it was necessary to search the route tables of all of c, d, g, h. However, according to the present invention, only c and h are required to be searched.

First, the transmitter mounting the address appearance order assembles the packet same as the transmitter having the destination address, and the constant MSC REGULATED is written in the MSC option.

The router R1 mounting the processing for searching the route table of all destinations only when branching is necessary, after confirming that the IPv6 destination address is MSC, confirms that MSC REGULARED is written in the MSC option. In this case, the path is searched only at both ends c, h of the bit map. Since both are by way of r2, nothing is searched about d, g, and they are directly related to r2.

On the other hand, the router R2 mounting the processing for searching the route table of all destinations only when branching is necessary similarly searches c and h. This time, it is known that c must be relayed to the interface of X, and h to Z. Therefore, d and g are also searched, and d is relayed to X, and h to Z.

Example of Branching Regularity Inspection:

An example of compilation of the branching regularity list mentioned above will be explained here. The overall sequence is as follows.

Program: Request to set destination list in branching regularity.

Transmitter: Transmission of search packet including destination list.

Router: Recording of branching history while relaying search packet.

Client: Returning of reaching search packet to transmitter in every branching history.

Transmitter: Creation of branching regularity list from the branching history. Returning of identifier corresponding to branching regularity list.

Program: Packet transmission by adding identifier to destination.

Figure 10:
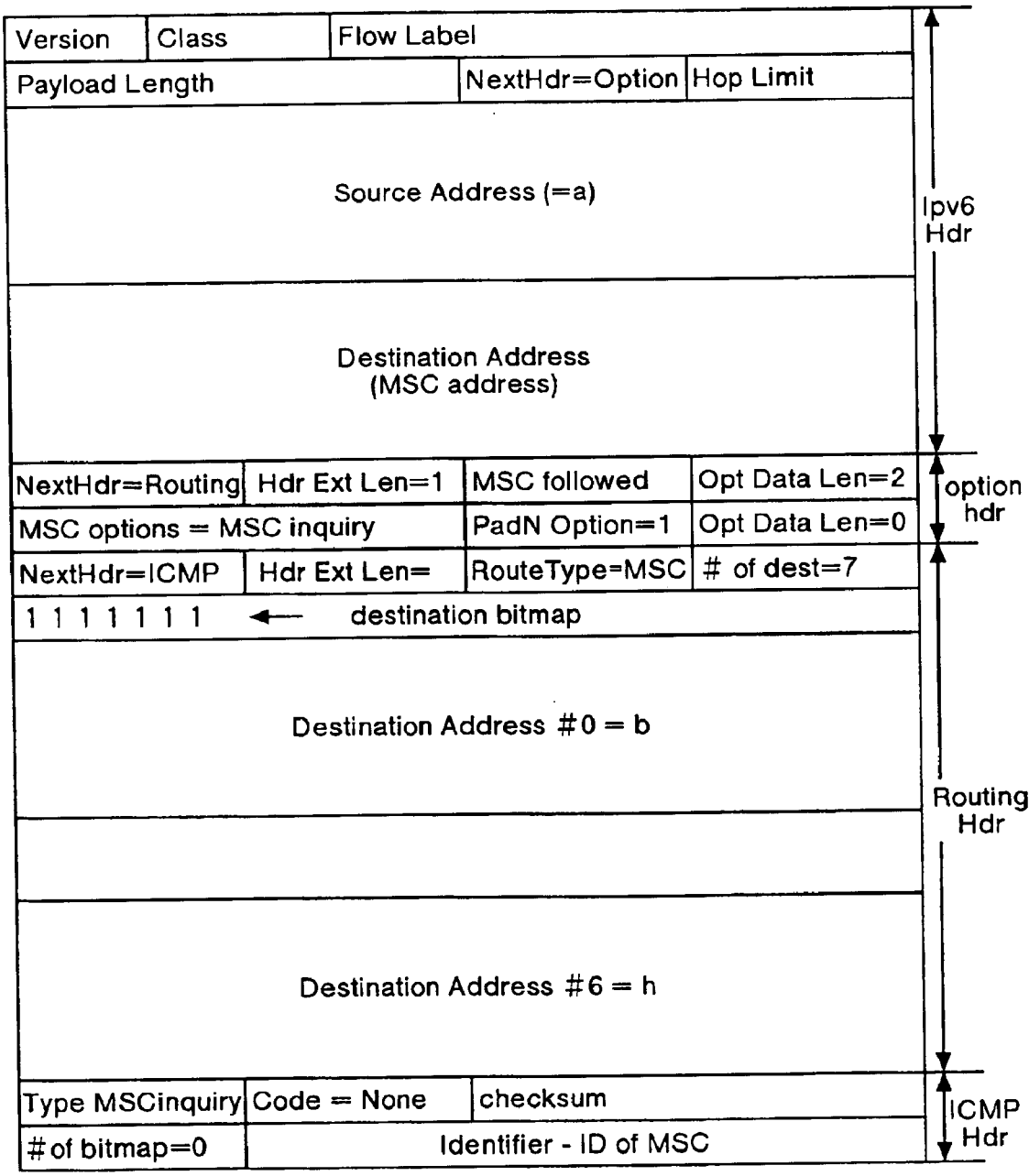
FIG. 10 is a diagram showing an example of composition of packet.

The transmitter creates the search packet having the following information, and transmits according to the method of the invention.
Ipv6 src =a
Ipv6 dst =MSC
Ipv6 opt =MSC followed
MSC option =MSC branch inquiry
RoutingHdr NextHdr=ICMP
Route Type =MSC
# of dest =7
bitmap =[1,1,1,1,1,1,1]
dest addr =[b,c,d,e,f,g,h]
ICMP Type =MSC Branch Inquiry
ICMP Code =None
ICMP bitmap len=0
ICMP Identifier =ID identified by every MSC inquiry The packet at this time is as shown in FIG. 10.

The router, while making relaying operation same as in claim 1, updates the ICMP header as follows if there are two or more interfaces to be relayed, that is, branching occurs.

1 is added to #of bitmap.

A new bitmap is added to the end of ICMP header.

When relaying to e and f by router R1, the ICMP header changes as shown in FIG. 11.

Receiving it, e returns the copy after Routing header to a as follows.
Ipv6 src =e
Ipv6 dst =a
Ipv6 opt =None
Ipv6 NextHdr =ICMP
ICMP Type =MSC Branch record
ICMP Code =None Hereinafter, copying after Routing header.

Figure 12:
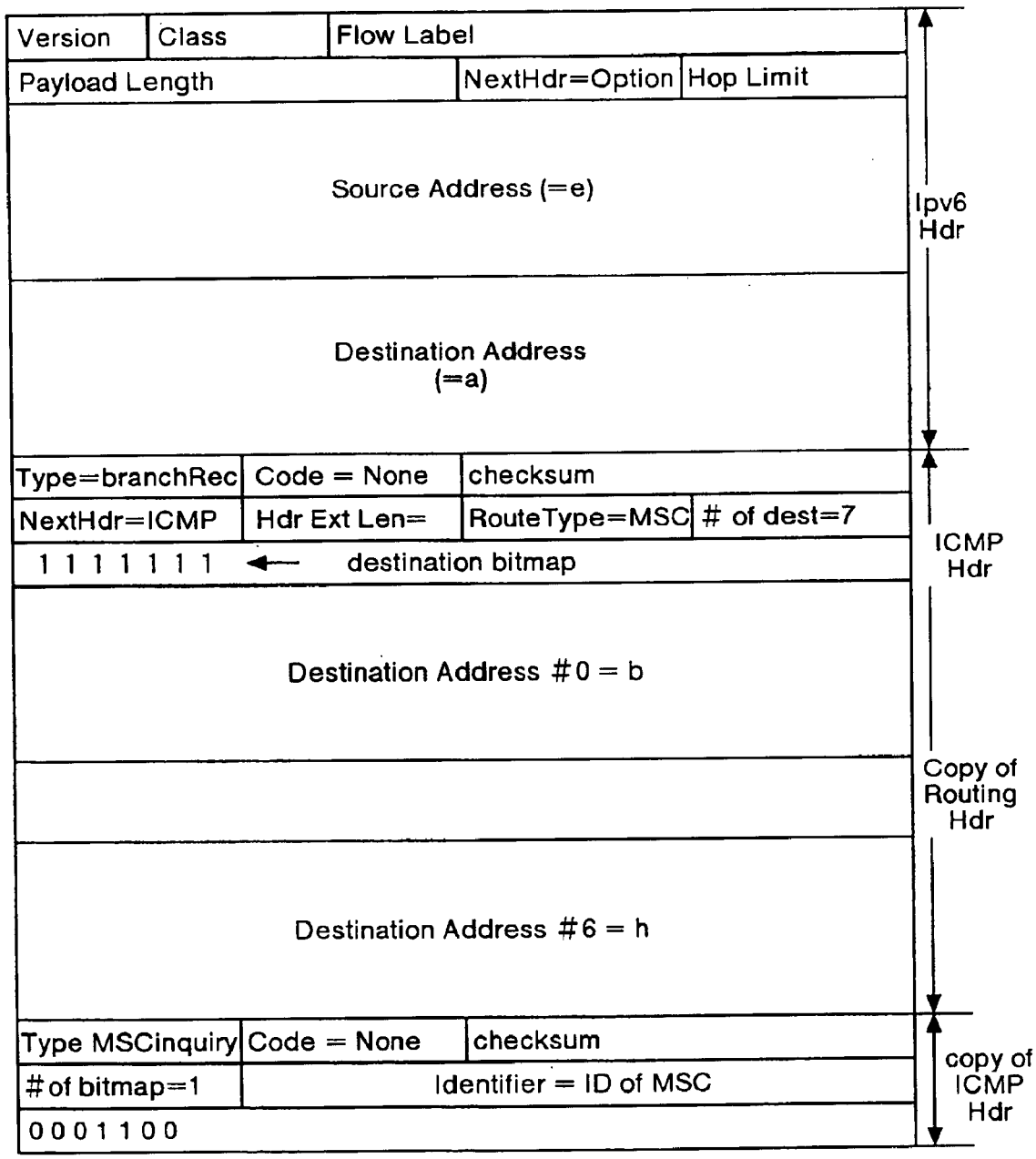
FIG. 12 is a diagram showing an example of composition of packet.

At this time, the packet is specifically as shown in FIG. 12.

In this case, similar packets return from all the clients. This transmitter collects packets identical in Identifier. In this example, the following history is returned.
[b,c,d,e,f,g,h]
b: [1,0,0,0,0,0,0]
c: [0,1,1,1,1,1,1]
   [0,1,1,0,0,1,1]
   [0,1,1,0,0,0,0]
   [0,1,0,0,0,0,0]
d: [0,1,1,1,1,1,1]
   [0,1,1,0,0,1,1]
   [0,1,1,0,0,0,0]
   [0,0,1,0,0,0,0]
e: [0,1,1,1,1,1,1]
   [0,0,0,1,1,0,0]
   [0,0,0,1,0,0,0]
f: [0,1,1,1,1,1,1]
   [0,0,0,1,1,0,0]
   [0,0,0,0,1,0,0]
g: [0,1,1,1,1,1,1]
   [0,1,1,0,0,1,1]
   [0,0,0,0,0,1,1]
   [0,0,0,0,0,1,0]
h: [0,1,1,1,1,1,1]
   [0,1,1,0,0,1,1]
   [0,0,0,0,0,1,1]
   [0,0,0,0,0,0,1]

Figure 13:
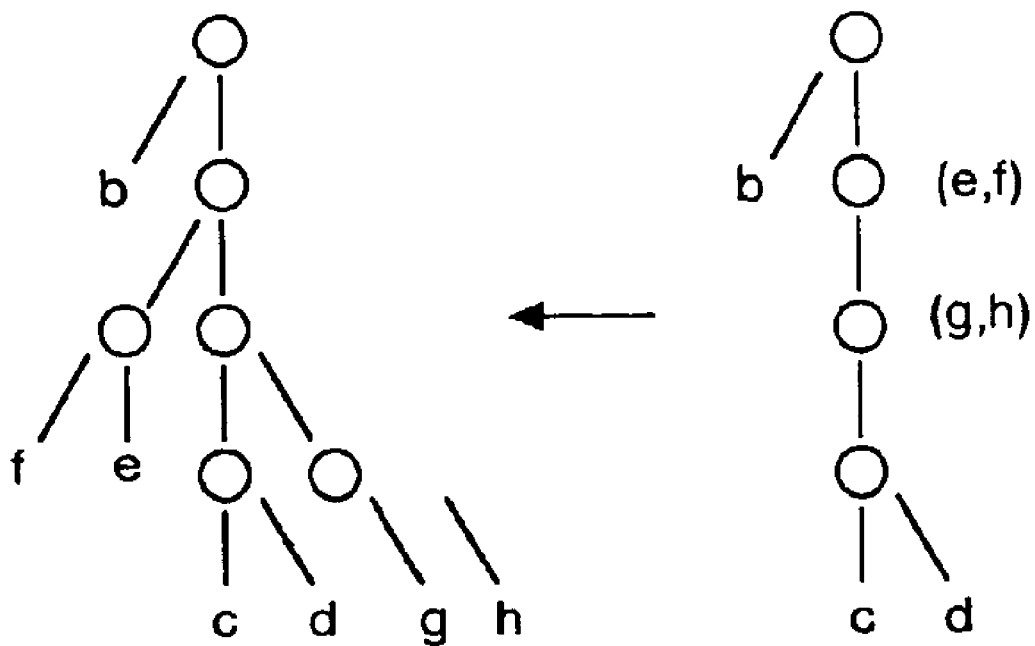
FIG. 13 is a diagram showing an example of composition of branching tree.
Figure 14:
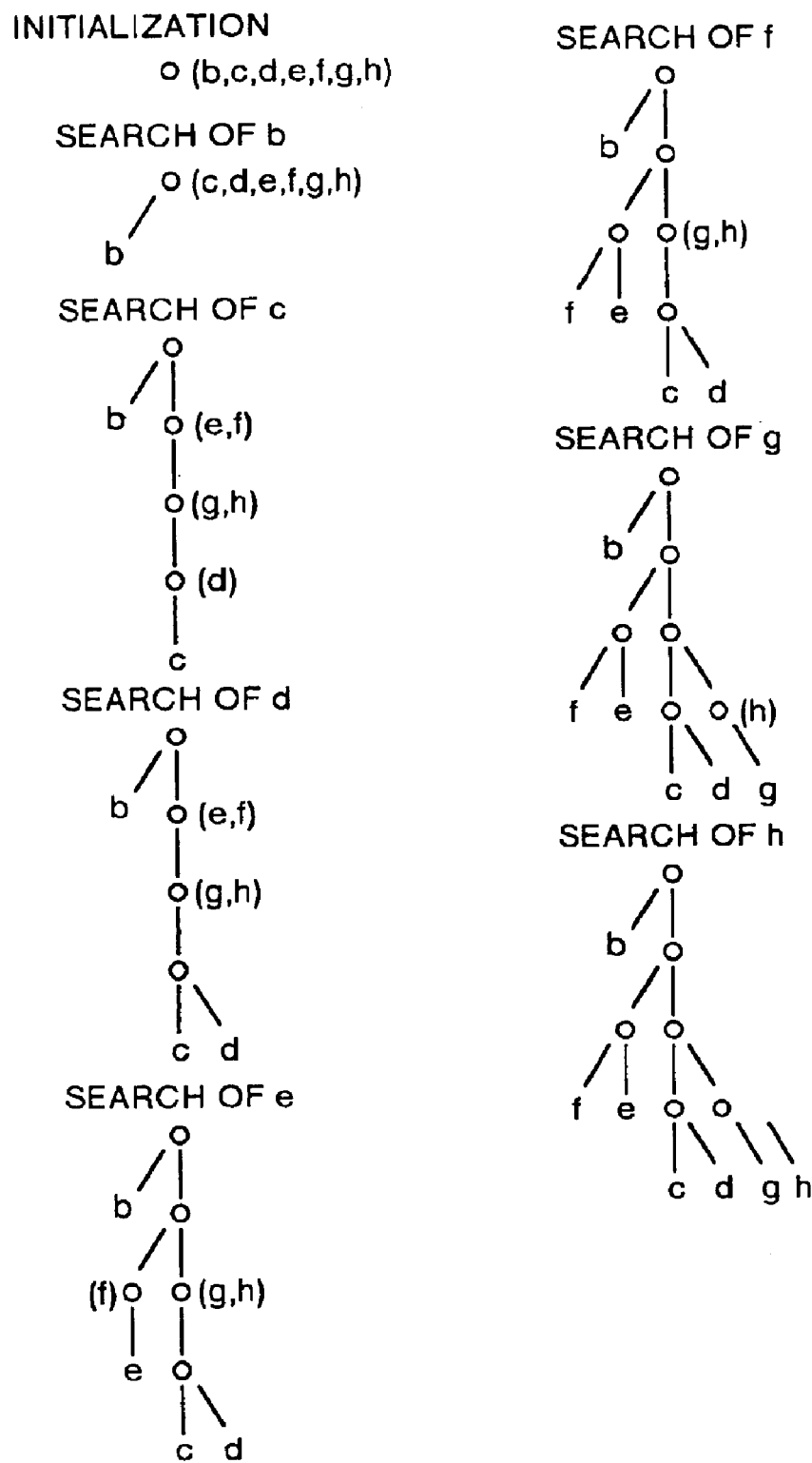
FIG. 14 is a diagram showing creation of branching tree.

From now on, the branching regularity list is created in the following procedure.
struct regular list*make regular list( )[/* To make a regular list,
*/
struct tree tree;
tree =make tree( ); /* A branching tree is created. */ return make list (tree)/* Branching tree is made into a list. */
*/ The branching tree is formed as shown in FIG. 13. o-mark in this figure denotes the router. At the side of the router, (e, f) or the like is attached, and it shows branching, and the lower branching structure is a list of undecided nodes.
*/
make tree( )[/* A branching tree is created. */
A router as the root of the branching tree is created. Then, all nodes are put into the undecided node list.
/*o(b,c,d,e,f,g,h)*/
for(i=0; i<# of node;i++)[/* About all nodes */
The history returned from node i is checked.
depth=branching depth of node i.–* If b, then 1, if h, then 4/*
for (j=depth of root with node i.

depth;j>0;j++)
  A router is created from the router with node i and extended.
  Node i is moved to newly made router.
]
  Now, e hangs on the router with node i.
for(j=# of bitmap ;j>0;j--)/* About all history */
foreach (node changed by j-th and j-1-th history)
  if (node is undecided)
  In router series up to node i, registered as undecided node in router with depth of j-1.]
make regular list(tree)[
  Searching tree by depth priority, nodes are listed up.
]
  Applying the above procedure into an example, a branching tree is created as shown in FIG. 14.
  Example of Efficient Branching Regularity Inspection:
  In branching inspection, returning of history from all clients is not necessary. For example, it is evident that branching tree (h) in the midst of analysis of branching tree shown in FIG. 15 can be put beside g without having history of h. Accordingly, by suppressing the search packet relay to h even in such a case, the inspection is made more efficient.
  Another embodiment of the preset invention is explained below.
  First, the transmitter prepares a search packet, and designates effect branch inquiry as MSC option.
  The router, when relaying this search packet, operates same as the router for relaying the search packet when not branching, but counts the groups in every relay destination interface, and divides as shown in FIG. 16.
  In the case of (a), all are relayed.
  In the case of (b), if delaying destination is not limited by omitting, relaying is omitted for one group at each destination.
  In the case of (c), if delaying destination is not limited by omitting, relaying is omitted by selecting two groups for one destination, or one group for two destinations.
  In the transmitter, the route analysis means changes as follows.
make tree ( )[/* A branching tree is made. */
  A router as the root of branching tree is prepared.
  Then, all nodes are put into the undecided node list.
/*o(b,c,d,e,f,g,h)*/
for(i=0; i<# of node; i++)[/* About all nodes */
  The history returned from node i is reviewed.
  depth branching depth of node i. /* If b, then 1, if h, then 4 */
  for (j=depth of root with node i.
  depth;j>0;j++)
  The one router is created from the router with node i and extended.
  Node i is moved to newly made router.
]
  Now, e hangs on the router with node i.
for(j=# of bitmap;j>0;j--)/* About all history */
foreach (node changed by j-th and j-1-th history)
  if (node is undecided)
  In router series up to node i, registered as undecided node in router with depth of j-1.
foreach (about all routers) /* If increased by previous process */
if (if undecided nodes are 2 or less)
  Undecided node directly hangs on router.
]
  In [b, c, d, e, f, g, h], relaying to h, c, e, b can be omitted (see FIG. 17).

Figure 18:
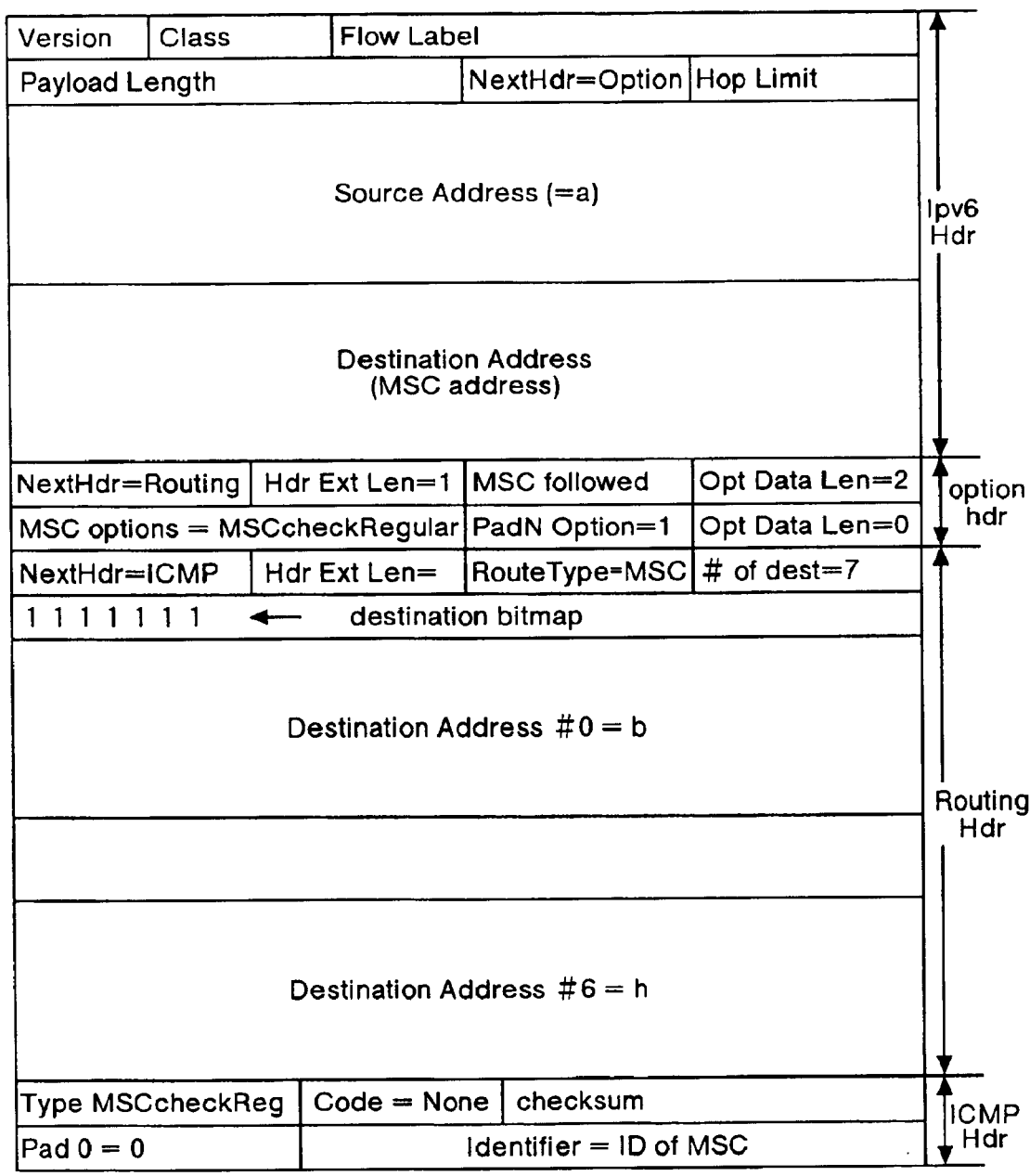
FIG. 18 is a diagram showing an example of composition of packet.
Figure 19:
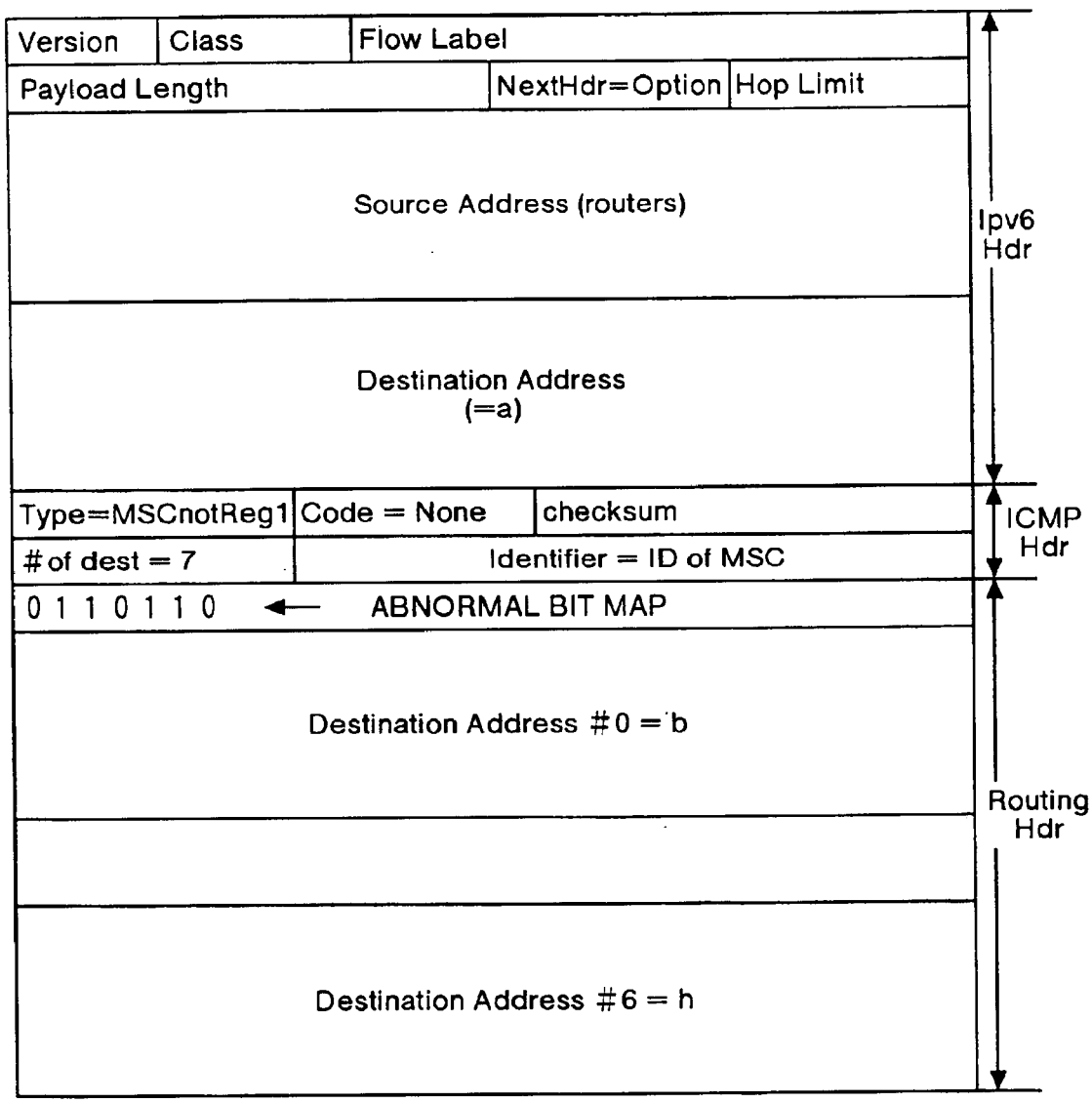
FIG. 19 is a diagram showing an example of composition of packet.

Destination Change:
  When the branching regularity is instructed by the program and the regularity is decided, the identifier returns. In the case of continuous flow of multicast packets, by using the previous regular list commonly, regularity is not repeated. However, if the client interrupts reception or a new client is added, regularity must be decided from the beginning.
  At this time, a transmitter for redoing regularity from the beginning can be used. The regularity processing itself is exactly the same as mentioned before.
  Concealment of Branching Destination:
  This is a repeating router for clearing all other than branching destination nodes, and concealing the communication destination to the own node from other clients. The operation is nearly same as that of the router in claim 1, but when sending the packet directly to b, the address is also cleared when changing the bit map.
bitmap =[1,0,0,0,0,0,0]
dest addr =[b,0,0,0,0,0,0]
  Following packet is transmitted to w.
bitmap =[0,1,1,1,1,1,1]
dest addr =[0,c,d,e,f,g,h]
  Regularity Inspection:
  The regularity is inspected periodically in order to cope with topological changes and troubles in the network. An example of other transmitter is explained below.
Ipv6 src =a
Ipv dst =MSC
Ipv opt =MSC followed
MSC option =MSC check regular
RoutingHdr Nexthdr=ICMP
RoutType =MSC
# of dest =7
bitmap =[1,1,1,1,1,1,1]
dest addr =[b,c,d,e,f,g,h]
ICMP Type =MSC check regular
ICMP Code =None
ICMP bitmap len=0
ICMP Identifier = ID identified by every MSC inquiry
  The packet is specifically as shown in FIG. 18.
  On the other hand, in the router for relaying it, since the MSC option is check regular, the nodes with bit map "1" are searched in all routes. Herein, if all are in the same route, or nodes at both ends are different relaying destination, ordinary MSC relaying is performed. Although both ends are at the same relaying destination, if there is a node of a different relaying destination between them, the following packet is returned to the transmission destination.
Ipv6 src =router addr
Ipv6 dsc =a
Ipv6 NextHdr =ICMP
ICMP Type =MSC not regular
ICMP Code =None
ICMP Identifier = ID identified by every MSC inquiry
  Setting is repeated so that abnormal node may be "0" at the bit map having abnormality. The packet is specifically as shown in FIG. 19. The transmitter receives it, and determines the regularity again.
  Non-MSC Routing:
  The first address of which bit map is "1" in the MSC routing header list is entered in "dest" of IPv6 packet. As a result, if there is an MSC non-conforming router on the way, relaying is continued toward one of the destination nodes. If there is an MSC conforming router or the destination node corresponds to the MSC, replaying starts newly toward other destination.

As explained herein, according to this embodiments, the following advantages are obtained.

1) Multicast communication in a small group can be realized without having any particular route management for multicast on the router on the Internet.

2) The sender can search the route topology, and arrange the destination information so as to lower the route search cost at the router.

3) The client can join or leave the multicast group without any action of router. At this time, too, the benefit of 2) is the same.

4) If there is a router not realizing the function of the invention on the way of the route, these merits are enjoyed similarly.

As explained herein, the invention brings about the following effects.

(1) According to the present invention, by having the means for replaying a packet having a list of the plurality of destination addresses and its undistributed bit map to the packet header to be transferred, according to the unicast route, multicast distribution is possible by the unicast route information alone without having multicast route information.

(2) According to the present invention, the node transmits by itself, inspects the packet arriving at its own interface, and accepts it when the own node is included in the destination list, and therefore multicast distribution is possible by the unicast route information alone without having multicast route information.

(3) According to the present invention, the route table is searched for the two nodes at both ends of the row not distributed in the undistributed bit map, and when branching is not necessary, route search for other address is omitted, and only when branching is necessary, the search table of all destinations is searched, and therefore at the time of multicast packet distribution, the number of unicast addresses to be searched is smaller, and the packet distribution process can be saved.

(4) According to the present invention, when branching the packet, the already distributed addresses are distributed after changing to values meaningless as address, so that the own participation can be kept secret to other clients engaged in the multicast.

Thus, according to the present invention, the multicast distribution system easy in address setting and router setting can be presented.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A multicast distribution system for transmitting and receiving a packet(s), the multicast distribution system comprising:
   at least one router connected with a cable;
   at least one node having an interface connected to the at least one router; and
   a relay unit provided either in the at least one router or in the at least one node,
   wherein the relay unit relays a packet having a packet header including a destination address list that indicates a plurality of destination addresses and a distribution bit map including a plurality of bits each corresponding to a respective destination address to which the packet is to be transferred and indicating whether or not the packet has already been distributed to its respective destination address in a unicast route.

2. The multicast distribution system according to claim 1, wherein the at least one node comprises a node that transmits the packet having the packet header including the destination addresses list and the distribution bit map inspects a packet that reached the own interface, and accepts the packet that reached when the packet header includes the destination address of the own node in the destination address list thereof.

3. The multicast distribution system according to claim 1, further comprising a transmitter which transmits the packet having the packet header including the destination address list that includes the plurality of destination addresses and the distribution bit map including the plurality of bits corresponding to the destination addresses, in the case of distributing a same packet to the plurality of destinations.

4. The multicast distribution system according to claim 1, wherein when branching the packet, the value of a bit representing an address to which the packet has been distributed already is changed into a value which renders meaningless the address as to further distribution of the packet.

5. A node provided in a multicast distribution system for transmitting and receiving a packet(s) having a packet header, the node comprising:
   a memory which stores
      a list of a plurality of destination addresses,
      a distribution bit map including a plurality of bits each corresponding to a respective destination address to which the packet is to be transferred and indicating whether or not the packet has already been distributed to its respective destination address; and
   a transmitter which writes the list and the bit map into the header of the packet and transmits the packet header.

6. A router provided in a multicast distribution system for transmitting and receiving a packet(s) having a packet header, the router comprising:
   a node which includes
      a memory which stores,
         a list of a plurality of destination addresses, and a distribution bit map including a plurality of bits each corresponding to a respective destination address to which the packet is to be transferred and indicating whether or not the packet has already been distributed to its respective destination address; and
   a transmitter which writes the list and the bit map into the header of the packet and transmits the packet;
   a receiving unit which receives a packet transmitted with a branching regularity mark indicating that the bits in the distribution bit map are sequentially arranged such that bits indicating undistributed nodes are continuously arranged; and
   a searching unit which searches a route table provided in the router about two nodes at both ends of a row not distributed in the distribution bit map, omitting route search about other address when branching is not necessary, and searching the route table about all destinations only when branching is necessary.

7. The multicast distribution system according to claim 3, wherein the transmitter creates a branching regularity mark indicating that the bits in the bit map are sequentially arranged such that bits indicating undistributed nodes are continuously arranged, and transmits the packet together with the branching regularity mark.

8. The multicast distribution system according to claim 7, wherein when the router relays the packet having the branching regularity mark transmitted by the transmitter, the router searches a route table provided therein about two nodes at both ends of a row of nodes whose address are in the route table, the bits corresponding to the two nodes being indicated as not yet distributed in the distribution bit map, and omits route search about the remaining addresses when branching is not found necessary, or searches the route table about all the destinations only when branching is found necessary as a result of the route search.

9. The multicast distribution system according to claim 7, wherein the transmitter transmits a branch search packet having an address list for searching for presence of branching in distribution route in which the packet is distributed, receives at least one packet including data on the result of the searching, and creates based on the data a bit map in which the bits corresponding to the addresses in the address list in the search packet are arranged sequentially such that bits indicating undistributed nodes are continuously arranged.

10. The multicast distribution system according to claim 9, wherein the router searches about a route table provided therein in response to the request in the branch search packet transmitted by the transmitter, and relays the packet after adding the distribution bit map to an undistributed route list until the packet reached to the own router when branching the packet, or relaying the branch search packet directly if no branching is necessary.

11. The multicast distribution system according to claim 10, wherein further comprising a node that relays the packet and includes a client that returns the undistributed route list of the branch search packet directly to the transmitter.

12. The multicast distribution system according to claim 1, further comprising a transmitter which transmits a route search packet for requesting the at least one router to search a route table provided therein and return a result of the search to the transmitter.

13. The multicast distribution system according to claim 12, wherein the router receives the route search packet from the transmitter, searches the route table provided therein, and relays the route search packet after adding a distribution bit map to the end of an undistributed route list indicating bits for representing undistributed destinations until the own router is reached when branching is found necessary, or the router relays the route search packet as it is when no branching is found necessary in the route.

14. The multicast distribution system according to claim 13, further comprising a node that relays the packet and includes a client that returns the undistributed route list of the route search packet directly to the transmitter.

15. The multicast distribution system according to claim 13, wherein in the case where the router finds that a plurality of routes to a neighbor router exist, indicated by only one or two destination addresses, as a result of route table search, the router relays the packet only to one such route that is indicated by two addresses or two such routes each of which indicated by only one address and omits relaying the packet to the balance of the routes.

16. The multicast distribution system according to claim 1, further comprising a transmitter capable of adding or deleting at least one destination address from or to the destination address list during transmission of a series of packets.

17. The multicast distribution system according to claim 16, wherein the transmitter searches route about the at least one destination address added and keeps the bits in the bit map sequentially arranged such that bits indicating undistributed nodes are continuously arranged.

18. The multicast distribution system according to claim 1, further comprising a transmitter that transmits a regularity inspection packet for checking whether or not the destination address list is in branching regularity where the bits in the bit map are sequentially arranged such that bits indicating undistributed nodes are continuously arranged, and rearranges the bits when the transmitter receives a notice indicating that the bits are not in branching regularity from the at least one router.

19. The multicast distribution system according to claim 18, wherein the router receives the regularity inspection packet, searches the route table provided therein for the destination address list in the regularity inspection packet, and returns to the transmitter an irregularity notice notifying that the bits are not in branching regularity when the branching regularity is broken, and relays the regularity inspection packet otherwise.

20. The multicast distribution system according to claim 19, wherein the transmitter and the router writes in the header of the packet an address of one node, the bit in the bit map of which has a value indicating an undistributed state as a former address of the packet.

21. A method of multicast routing, comprising:
multicasting a multicast packet to multicast destinations using only unicast routing to route the multicast packet to the multicast destinations, where the multicast packet contains information identifying the multicast destinations, and as the packet is unicast routed it is modified with respect to the destinations therein to prevent the packet from being routed more than once to any of the destinations.

22. A method of multicast routing, comprising:
multicasting a multicast packet to multicast destinations using only unicast routing to route the multicast packet to the multicast destinations, where the packet includes a packet header including a destination list that indicates a plurality of the multicast destinations and a distribution map comprising a plurality of flags each corresponding to a respective destination in the list to which the packet is multicast and indicating whether or not the packet has already been distributed to its respective destination in a unicast route.

* * * * *